United States Patent [19]

Ramprasad et al.

[11] Patent Number: 5,141,725
[45] Date of Patent: Aug. 25, 1992

[54] PROCESS USING CYANOCOBALTATE COMPLEXES FOR REMOVING OXYGEN FROM A STREAM

[75] Inventors: Dorai Ramprasad; Guido P. Pez, both of Allentown; Ronald M. Pearlstein, Macungie; Ingrid K. Meier, Easton, all of Pa.

[73] Assignee: Air Products and Chemicals, Inc., Allentown, Pa.

[21] Appl. No.: 669,811

[22] Filed: Mar. 15, 1991

[51] Int. Cl.[5] .............................................. C01B 13/00
[52] U.S. Cl. ................................... 423/219; 423/143; 423/377
[58] Field of Search ........................ 423/143, 219, 377

[56] References Cited

U.S. PATENT DOCUMENTS

| | | | |
|---|---|---|---|
| 3,980,763 | 9/1976 | Mullhaupt | 423/579 |
| 4,251,452 | 2/1981 | McAuliffe | 260/429 |
| 4,477,418 | 10/1984 | Mallhaupt | 423/219 |
| 4,830,999 | 5/1989 | Drago | 502/74 |

OTHER PUBLICATIONS

R. S. Drago et al "Entrapment of an Anion Stable Moisture-Resistant Oxygen Carrier in Zeolyte Y" J. Amer. Chem. Soc., 110, p. 304 (1988).
G. A. Kozlor et al "Structure and Properties of the Products of Reaction Between Molecular Oxygen and New Salts of Pentaoyanocobaltate (II) Anion" Teoreticheskaya e Eksperimentalnaya Khimiya 17, (5) 686.
S. Inamura, et al, "Separation of Oxygen from Air by [Co II(bpy)(terpy)]$^{2+}$Complexes in Zeolite Y", Tangmuir 1985, 1, 326–(1985).
R. F. Taylor et al, "Characterization of a Cobalt (II) Cyanide Complex Inside Zeolite Y that Reversibly Binds Oxygen", J. Amer. Chem. Soc., 111, 6610 (1989).
S. F. Carter, et al, "Cobalt (II) Cyanides in Aprotic Media:Effect of Varying Counterion and Solvent", Inorg Chem., (1986), 25, 2888-2894.
F. A. Cotton, et al, "Survey of the Transition Elements", Advanced Inorganic Chemistry Fifth Edition, Wiley Interscience Publication.
S. F. Carter, "Synthesis Characterization and Reactions of New Organocyanocobaltates", Thesis Brandes University 1988.
F. H. Hildebrand, "The Thermal Dissociation of Barium Peroxide", J. Amer. Chem. Soc., 34, p. 246 (1912).

*Primary Examiner*—Gary P. Straub
*Assistant Examiner*—Timothy C. Vanoy
*Attorney, Agent, or Firm*—Mark L. Rodgers; William F. Marsh; James C. Simmons

[57] ABSTRACT

A process is provided for selectively separating oxygen from an oxygen-containing fluid stream by bringing said fluid stream into contact with a high capacity solid state cyanocobaltate complex in a non-aluminosilicate environment represented by the chemical formula:

$$A_{x/z}{}^{z+}[Co(CN)_n]^{x-}\cdot pS$$

where:
A is an alkali, alkaline earth, transition, or Group 12 metal atom;
z is 1, 2 or 3;
n is any number from 3 to 5;
x is n−2;
p is any number from greater than zero to 6; and
S is a ligand which is capable of coordinating with $A^{z+}$, Co or both.

These complexes chemically bind oxygen to form novel oxygen adducts, thereby selectively removing oxygen from the fluid stream. The bound oxygen may be recovered by increasing the temperature or by reducing the partial pressure of $O_2$ above the adduct.

23 Claims, 1 Drawing Sheet

PROCESS USING CYANOCOBALTATE COMPLEXES FOR REMOVING OXYGEN FROM A STREAM

TECHNICAL FIELD

The present invention relates to the selective separation and recovery of oxygen from air or other oxygen-containing fluid streams.

BACKGROUND OF THE INVENTION

Gas separations may be carried out by a number of methods including distillation at cryogenic temperatures, the use of permselective membranes and by processes that utilize compositions that can reversibly and selectively sorb a component of the gas mixture. For sorption-based separation of air, current commercial technologies utilize zeolite molecular sieves as $N_2$-selective adsorbents and carbon molecular sieve (CMS) materials as $O_2$-selective adsorbents. These technologies, which are usually employed for the production of enriched nitrogen or oxygen, (rather than very high purity $N_2$ or $O_2$) have several inherent limitations which restrict their competitiveness against the cryogenic and membrane separation methods.

Synthetic zeolites reversibly adsorb nitrogen in preference to oxygen. When used for instance in a pressure-swing adsorption (PSA) process for the separation of air, the zeolite bed selectively takes up the nitrogen which is recovered by de-pressurization or evacuation of the bed. The drawback in this separation method is that it is performed inefficiently by adsorbing nitrogen which is the major component of air.

The potential advantages of selective oxygen sorbents have long been recognized and there has been much research effort directed at the synthesis of suitable materials. At the present time carbon molecular sieve (CMS) kinetically oxygen selective adsorbents are used in PSA air separation processes for the production of either enriched $N_2$ or $O_2$. Several factors limit the productivity and hence the cost-effectiveness of this technology. Even the most effective current CMS sorbents have a poor working $O_2/N_2$ selectivity in the PSA process. The necessarily short cycle times of the PSA process and the limiting oxygen adsorption kinetics lead to a poor utilization of the adsorption bed.

U.S. Pat. No. 4,477,418 discloses solid state transition metal hexacyano compounds (cyanometallates) defined as $M_x[M'(CN)_6]_y$ where M=Sc, Mn, Fe, Co, Ni etc and M' is strictly Cr, Mn, Fe, Co which are selective oxygen sorbents which are taught to be useful in processes for the separation of oxygen. The hexacyanometallate solids can be microporous, containing very small voids within their structures. In certain cases, depending on the specific formula, when the voids are of molecular dimensions the compounds have been described as "molecular sieves" since only molecules that are less than a certain effective diameter are adsorbed within their structures. The experimental data presented in U.S. Pat. No. 4,477,418 show that a number of the listed hexacyanometallates exhibit $O_2$ versus $N_2$ adsorption selectivity. Selectivity is seen at short contact times but also, to a lesser extent, at apparent equilibrium conditions. Among the compositions studied there are wide variations in both the time-dependent (i.e. kinetic) and equilibrium values of the oxygen loading, $O_2/N_2$ selectivity (ratio of oxygen to nitrogen loading) and in the kinetics of oxygen adsorption. The data show an approximate inverse relationship between the rate of oxygen uptake and the $O_2/N_2$ selectivity which is consistent with a molecular sieving or size-selective physical adsorption process, one which is more favorable for entry of the smaller $O_2$ molecule.

A relatively limited number of solid state chemical $O_2$-selective sorbents are known. One of the oldest is the barium oxide/peroxide system disclosed by J. H. Hildebrand, *J. Amer. Chem. Soc.*, 34, 246 (1912), which on the basis of the reversible equilibrium: $BaO + \frac{1}{2}O_2 \rightleftharpoons BaO_2$ at about 600° C. was once used in an industrial process for the separation of air. U.S. Pat. No. 3,980,763 discloses praseodymium oxide materials which bind $O_2$, converting it to an oxide ($O^{2-}$) ion. The process is temperature/pressure reversible at about 400° C.-500° C., and is said to have the advantage over $BaO_2$ of not being deactivated by atmospheric carbon dioxide. It is taught in U.S. Pat. No. 4,251,452 that solid manganese phosphine complexes reversibly absorb oxygen, however, the number of reversible oxygen adsorption and desorption cycles that can be obtained appears to be quite limited.

Solid state compositions prepared by an entrapment or encapsulation of a metal complex within the cage of a synthetic zeolite have been shown to function as reversible oxygen sorbents. R. S. Drago, et al, *J. Amer. Chem. Soc.*, 110, 304 (1988) and U.S. Pat. No. 4,830,999 both teach entrapment of the anionic cobalt(II) cyanide (cyanocobaltate(3-)) complexes as ion-paired species: $A^+{}_3[Co(CN)_5]^{3-}$ or possibly $A^+{}_2[Co(CN)_4]^{2-}$ ($A^+$ is $Na^+$, $Cs^+$, etc.) within the pores of a crystalline aluminosilicate zeolite, to yield solid state $O_2$-selective sorbents. While the compounds $A^+{}_3[CO(CN)_5]^{3-}$ dissolved in water or polar organic solvents are well known to bind oxygen (giving either superoxo or peroxo complexes, depending on conditions), the $O_2$-binding is always considered to be irreversible (Ref. G. A. Kozlov, et al, *i Teoreticheskaya Eksperimental'naya Khimiya*, 17 (5) 686 (1984)). Thus for example, heating the superoxo complex, $[NEt_4]^+{}_3[O_2Co(CN)_5]^{3-}$, at 120° C. in vacuo gives only a mixture of decomposition products: $O_2$, $CO_2$, butene and other hydrocarbons. The observed reversible binding of $O_2$ by the same monomeric anionic complex in the zeolite, as described in U.S. Pat. No. 4,830,999, is attributed to as yet uncharacterized interactions between the complex and the walls of the zeolite cavity in which it resides. These interactions significantly change the nature (effectively alter the composition) of the complex such that it becomes reversibly $O_2$-binding.

While the entrapment of oxygen-carrier complexes in zeolites affords $O_2$-selective solid sorbents, there are significant disadvantages in this technique. Because of the need to incorporate (usually by ion-exchange methods) $Co^{2+}$ ions as well as the accompanying organic ligands (e.g. SALEN, $CN^-$, etc.) in zeolite cages of fixed and usually very small dimensions, and also at the same time retain a certain degree of "openness" within the structure for facile accessibility by $O_2$, the practical loading level of the active $O_2$-binding Co(II) species is often quite small. Thus, as taught by S. Imamura, et al, *Langmuir*, 1, 326 (1985), in $[Co^{II}(BPY)(TERPY)]$-LiY, cobalt complex in LiY zeolite composition, the concentration of $Co^{II}$ active centers is only $1.05 \times 10^{-2}$ mmole/g of zeolite (giving a capacity of about 0.022 cc $O_2$/g). In the case of the $Co(CN)_5{}^{3-}/Co(CN)_4{}^{2-}$ in zeolite Y sorbent, although a relatively high concentration of $Co^{+2}$ (up to 7.1 wt % or 1.2 mmoles/g) can be incorporated, by spectroscopic measurements less than 1% of this cobalt is in an active $O_2$-binding configuration (Ref. R. J. Taylor, et al, *J. Amer. Chem. Soc.*, 111, 6610 (1989)). The second drawback of zeolite entrapped metal complex sorbents is their relatively high "background" adsorption capacity for $N_2$ which limits their $O_2/N_2$ selectivity in air separation applications. While the $Co(CN)_5^{3-}/Co(CN)_4^{2-}$ sorbent in zeolite Y at 40 torr pressure has a selectivity ($\alpha O_2/Ar$) of ~1.3 on the basis of data given in the above reference, the sorbent's oxygen to nitrogen selectivity, (because of the high natural adsorptivity of the latter), is calculated to be less than 1; i.e., about 0.7.

The objective in the art has been to develop easily synthesized solid state metal complex oxygen carriers which have a rapid reactivity and a high reversible equilibrium capacity for oxygen and a relatively low affinity for nitrogen. Additionally, such adsorbents should retain these properties in $O_2$ recovery applications over a long period of time. Prior to the present invention, no process has been taught which employs adsorbents which meet all of the above qualifications.

S. J. Carter, et al, *Inorg. Chem.* 25, 2888–2894 (1986) disclose the synthesis of what they believed to have been $Li_3[Co(CN)_5]\cdot 3DMF$, although they were unable to purify the material produced in their synthesis reaction. This reference teaches the use of this complex for cyanation reactions, and it is specifically stated that, based upon the research presented in the article, this compound would not be the preferred choice for such reactions. No mention is made of the suitability of this or any similar compound for reversibly binding oxygen. Carter also reported similar findings in a thesis entitled "Synthesis, Characterization and Reactions of New Organocyanocobaltates" Brandeis University, 1988.

SUMMARY OF THE INVENTION

The present invention is a process for removing oxygen from an oxygen-containing fluid stream by bringing the fluid stream into contact with a solid state cyanocobaltate complex represented by the chemical formula:

$$A_{x/z}{}^{z+}[Co(CN)_n]^{x-}\cdot pS$$

where:
A is an alkali, alkaline earth, transition, or Group 12 metal atom;
z is 1, 2 or 3;
n is any number from 3 to 5;
x is n−2;
p is any number from greater than zero up to 6; and
S is a ligand which is capable of coordinating with $A^{z+}$, Co or both;

In this process, the cyanocobaltate complexes selectively bind (i.e., sorb) oxygen thereby removing oxygen from the oxygen-containing fluid stream. These complexes operate by chemically reacting with oxygen to form oxygenated stable complexes which are unique oxygen adducts of the above cyanocobaltate complexes and which can be represented by the structural formula:

$$A_{x/z}{}^{z+}[Co(CN)_n\cdot O_2]^{x-}\cdot pS$$

where A, z, x, n, p and S are the same as above.

The above described process for selectively binding or sorbing oxygen can be reversed to cause the release of the bound oxygen to regenerate the complex and recover the oxygen. This can be achieved by heating the adduct or by any means which reduces the partial pressure of $O_2$ above the adduct, such as evacuating or passing a sweep gas over the adduct.

The present process is advantageous over prior art oxygen sorption processes in that solid state materials are utilized which rapidly sorb oxygen, and which even at equilibrium have a high capacity and selectivity for oxygen over nitrogen and other gases. This is due in part to the fact that the cyanocobaltate complexes used in the present process have a reversible chemical affinity for oxygen, rather than relying primarily on their physical characteristics for adsorbing oxygen as is the case with zeolites and carbon molecular sieves. This chemical binding reduces or eliminates problems encountered in prior processes relating to kinetically dependent adsorption and poor adsorption at or near equilibrium conditions. An additional advantage in using the present complexes is that they can be used in a non-aluminosilicate environment (i.e., they do not have to be encapsulated in the cage of a zeolite) to reversibly bind oxygen.

BRIEF DESCRIPTION OF THE DRAWING

The graph of the accompanying Figure shows the gravimetric oxygen/nitrogen cycling data for the process of the present invention using $Li_3[Co(CN)_5]\cdot 2DMF$ as the reversible oxygen sorbent.

DETAILED DESCRIPTION OF THE INVENTION

The present invention is a process which uses solid state complexes which chemically react with oxygen to selectively sorb the gas and thus permit its separation and recovery from air or other fluid mixtures. The complexes are solid state materials wherein the active reversibly $O_2$-binding species are anionic, pentacyano-, tetracyano- and lower cyanide coordination number complexes of cobalt. The process is operated by simply bringing an oxygen-containing fluid stream into contact with the solid state complexes, such as in typical temperature or pressure swing adsorption processes, although the present process can be used in any separation process designed for separating and/or scavenging oxygen, even in trace amounts, from a gas stream or from a liquid in which oxygen has been dissolved. Specific applications for the present process include the separation of oxygen from gas streams containing oxygen and nitrogen, such as air, and for the separation of trace amounts of oxygen from a stream comprising predominently argon. The present process is advantageous over other prior art separation processes in that solid state complexes are used which reversibly bind oxygen, thereby allowing the sorbed oxygen to be recovered, and the sorbent (complex) to be regenerated by heating or by reducing the $O_2$ partial pressure over the adduct.

The oxygen-reactive sorbents used in the present process are cyanometallates of cobalt(II) which contain at least three but not more than five cyanide ligands around the cobalt central metal atom ions, and which can be represented by the chemical formula:

$$A_{x/z}{}^{z+}[Co(CN)_n]^{x-}\cdot pS$$

where:
A is an alkali, alkaline earth, transition, or Group 12 metal atom;

z is 1, 2 or 3;
n is any number from 3 to 5;
x is n−2;
p is any number from greater than zero up to 6; and
S is a ligand which is capable of coordinating with $A^{z+}$, Co or both.

In the above structural formula, cyanide is ligated to cobalt through carbon while n, the number of cyanide ligands per cobalt atom ranges from a maximum of 5 to a minimum of 3. Since the formula represents an overall composition of a complex solid-state structure which may contain different $[Co(CN)_n]^{x-}$ units (depending on the value of n), n in the above formula may be a fractional number. $A^{z+}$ is an alkali (Group 1), alkaline earth (Group 2), transition (Groups 3-11), or Group 12 metal cation. This Group nomenclature is as listed in the Periodic Table of the Elements in Cotton and Wilkinson "Advanced Inorganic Chemistry" 5th Ed. Wiley-Interscience. Of the alkali and alkaline earth metal cations, the smaller, high charge density cations such as lithium and magnesium are preferred. Of the transition metals, $Fe^{2+}$, $Fe^{3+}$, and $Cu^{2+}$ are preferred. Of the Group 12 series, $Zn^{2+}$ and $Cd^{2+}$ are preferred. Finally, $A^{z+}_{x/z}$ may also constitute two or three different cations with z separately ranging from 1 to 3, the number and total charge of the cations being so chosen as to maintain overall electrical neutrality for the structural formula.

The cobalt central metal ion in the above formula is in a divalent state, thus x=n−2. Since, however, there is the possibility that the overall composition expressed by the above formula contains $[Co(CN)_n]^{x-}$ units with different values of n, n and x in the formula may be fractional numbers.

In the formula, S represents a ligand, or several different ligands, of total number p, wherein p may be any number greater than zero and up to 6, including fractions since more than one structure represented by the above formula may be combined to form the total complex. In preferred embodiments, p is from 2-3. These ligands (S) may coordinate to the $A^{z+}$ ion or to the cobalt ion (but only when n<5), or both.

Representative examples of S when the ligand is bound to the $A^{z+}$ ion include: N,N-dialkyl formamides (preferably DMF), N,N-dialkylamides and alkyl lactams (preferably N,N dimethylacetamide, N-methyl-2-pyrrolidinone and N-methyl piperidone), N-alkyl imides such as N-methyl succinimide, ammonia and potentially chelating tertiary amines such as N,N,N',N'-tetramethyl ethylenediamine and hexamethylenetetramine, as well as organic carbonates, sulfur-oxygen, and phosphorus-oxygen compounds.

Representative examples of S when the ligand is bound to the cobalt atom include: N-heterocycles such as pyridine, alkyl or perfluoralkyl ring-substituted pyridines, N-methylimidazole and 1,2; 1,3 and 1,4-diazines; bipyridyls and alkyl or perfluoralkyl ring-substituted dipyridyls; organic nitriles such as dicyanogen, $N\equiv C-C\equiv N$, acetonitrile, benzonitrile, t-butylnitrile, and dicyanoalkanes: $N\equiv C(CH_2)_{n'}C\equiv N$ where n'=1 to 4; cyanamides such as the dicyanamide anion, $N\equiv C-\overline{N}-C\equiv N$; the dicyanomethane (anion), $N\equiv C-\overline{CH}-C\equiv N$; and halide and pseudohalide ions such as $Cl^-$, $F^-$, $SCN^-$, and $NCS^-$.

Where appropriate, the above ligands may be halogenated, in particular fluorinated, for greater stability towards oxidation, or additionally, may be polymeric analogues of any of the above. While it is required that there be some ligand (S) bound to the complex, additional molecules corresponding to any of the above compounds may be present as unbound solvate molecules.

These compositions are generally prepared by reacting a cobalt(II) halide or pseudohalide with an alkali metal or alkaline earth cyanide salt in a molar ratio of $1Co^{2+}:nCN^-$, in a polar solvent (usually corresponding to the ligand (S) in the formula). Solids thus formed may be per se reactive towards $O_2$ or may be activated for reversible binding of $O_2$ by judicial heating or drawing a vacuum to expel a portion of the ligand S, or altering the ligands by solvent replacement. Compositions containing divalent or trivalent (z=2,3) ions may be prepared by the direct reaction of Co(II) halides with cyanide compounds of these ions or by metathetical reactions of solutions containing $[Co(CN)_n]^{x-}$ species with suitable sources of the $A^{z+}$ cations.

In the present process, these compositions act as chemical sorbents for oxygen wherein the sorbed oxygen is attached to the cobalt(II) to form the oxygen adduct of the solid-state cyanometallate complex. Chemical bonding of oxygen with these complexes to form the oxygen adducts of the respective complexes is accompanied by changes in the UV/visible spectrum of the complex, the appearance of an O-O stretching frequency ($\nu_{O-O}$) which is significantly lower than that of free gaseous (or physically adsorbed) oxygen, and also by a "blue shift" in the $\nu_{CN}$ vibration. These analytical techniques were used to determine that, unlike the prior art hexacyanometallates, the compositions used in the present process chemically and reversibly bind oxygen. Without being bound by theory, it is believed that the ability of the complexes used in the present process to reversibly bind oxygen is made possible by reducing the electron density on cobalt through the use of countercations $A^{z+}$ which are able to interact with the nitrogen of the cyanide ligand to form $Co^{II}-CN-A^{z+}-N-C-Co^{II}$ linkages. The effect is moderated by the use of coordinating ligands S which by binding to the cation $A^{z+}$ can weaken the $-CN-A^{z+}$ interaction. By thus controlling the electron density on cobalt not only is the binding of $O_2$ onto the $[Co^{II}(CN)_n]^{3-}$ unit rendered reversible, but its affinity for oxygen (i.e. the equilibrium binding constant for $O_2$) may be predictably altered.

The metal complex selective $O_2$-sorbent compositions are especially suitable for use in both pressure swing absorption (PSA) and temperature swing absorption (TSA) processes for the separation of air to recover oxygen or nitrogen or both.

In the pressure swing method, air (preferably dry) at ambient temperature and at pressures ranging from 1 to about 10 atm is passed through a column containing a fixed bed that is packed with the above cyanocobaltate solid absorbents. Oxygen is selectively absorbed by the packed bed resulting in an effluent of nearly pure nitrogen. The absorbent may take up as much as 2.3 mmoles of $O_2$ per gram. At the end of this absorption step the resulting oxygenated solid in the bed has to be regenerated. This may be done by lowering the pressure of the atmosphere above the absorbent bed to about ambient conditions or by partially evacuating it to subambient pressures as low as 0.1 atm. Alternatively, the desorption may be achieved by depressurizing the bed followed by purging it with some of the product nitrogen. The PSA methods described here may be used for the large scale production of oxygen or nitrogen from air, but are also useful for the removal of residual low levels of oxygen from nitrogen, argon and other gases that are inert to the cyanocobaltate absorbents.

In the temperature-swing method an oxygen-containing gas mixture, preferably a dry mixture, at from about 1 to 10 atm is passed through the absorbent column which results, as above, in a selective absorption of oxygen. In this case however, the regeneration of the absorbent is accomplished by heating. The desorption of $O_2$ may be assisted by also reducing the effective partial pressure of $O_2$ in the atmosphere above the absorbent by depressurization, partial evacuation to 0.1 to 0.3 atm, or by sweeping the bed with a pre-heated stream of some of the inert gas product. The latter is essentially a combined PSA/TSA process. Specific examples of PSA and TSA processes (though not with equilibrium $O_2$-selective sorbents) have been well described in the art.

In all of these processes the cyanocobaltate complexes are in the solid state and can be used in various forms such as powders, as single crystals, as pellets, as a slurry, or any other suitable form for the particular application.

The resultant oxygen adducts of the cyanometallate complexes which are formed during this process are unique structures which can be represented by the general chemical formula:

$$A_{x/z}{}^{z+}[Co(CN)_n \cdot O_2]^{x-} \cdot pS$$

where A, z, x, n, p and S are the same as set out above for the corresponding cyanocobaltate complexes. While the above chemical formula shows one oxygen molecule associated with the complex as written, there may, in some instances, be less than one oxygen molecule per this portion of the complex since the overall composition may contain more than one of the above structural units with a single oxygen molecule bound to several such units.

The following examples are presented to better illustrate the present invention and are not meant to be limiting.

EXPERIMENTAL

In the following Examples all chemical synthesis and oxygen sorbent handling operations were done (unless otherwise indicated) under cover of nitrogen or argon using standard Schlenk line, high vacuum line, or inert atmosphere dry box techniques. Reaction solvents were carefully dried and purified by distillation from $CaH_2$ (N,N-dimethylformamide, (DMF)), or from sodium benzophenone ketyl (diethyl-ether). Thermogravimetric (TGA) analysis experiments were carried out using Perkin Elmer TG52 and DuPont 2950 instruments, which were equipped for performing measurements in either an $N_2$ or $O_2$ atmosphere. Infrared spectra were taken using a Nicolet 510 or a Perkin-Elmer 6000 series FTIR spectrometer; the reported vibrational frequencies are considered to be accurate to within $\pm 2$ cm$^{-1}$.

EXAMPLE 1

Preparation of $Li_3[Co(CN)_5] \cdot pDMF$ Where p is 5, 4, and 3.5

Anhydrous cobalt chloride (1.25 g, 9.6 mmole) (Aldrich) was dissolved in 30 ml of DMF with warming. This solution was degassed and then transferred via stainless steel cannula to another flask containing 150 ml of 0.5M (50 mmole) LiCN in DMF (Aldrich 0.5M solution, used as received). The resultant green solution was cooled to 10° C. and kept overnight at this temperature. Green crystals formed at the bottom of the flask. The supernatant solution was removed via cannula transfer and discarded. The remaining green crystals were quickly rinsed with 2×30 ml portions of diethylether and then dried in vacuum (ca $10^{-3}$ torr) for a few hours at room temperature. A pale green solid interspersed with dark green chunks, was collected. Yield of product (compound labelled 1A)=2.63 g. An elemental analysis of one preparation of this compound gave a best fit with the formula $Li_3[Co(CN)_5] \cdot 5DMF(1A)$.

Calcd (%) for $C_{20}H_{35}N_{10}Li_3O_5Co$: C, 41.74; H, 6.08; N 24.35; Li, 3.62; Co, 10.24.

Found (%): C, 41.46; H, 5.98; N, 23.58; Li, 3.72; Co, 10.17. Infrared: (Nujol mull) Cyanide region, 2104 cm$^{-1}$(s), 2125 cm$^{-1}$(m)

For an x-ray structural determination, single crystals of the above compound were grown by a very slow addition of a 0.125M cobalt chloride solution in DMF to a 0.25M solution of LiCN also in DMF to a final total $Co^{2+}/CN^-$ molar ratio of 1:5.2. The crystals were filtered and collected under an $N_2$ atmosphere. X-ray diffraction data was collected with the crystals at $-120°$ C. under $N_2$. The x-ray crystal structure definitively showed that the composition of the material was $Li_3[Co(CN)_5] \cdot 4DMF$(compound 1). We believe that the first product, compound 1A above, was still "wet" with weakly adsorbed solvent thus accounting for the extra molecule of DMF.

In a slight modification of the above synthesis, $CoCl_2$ and LiCN in a 1:5.2 molar ratio were reacted in DMF solution at room temperature resulting in the precipitation of light green powder. This was filtered with copious quantities of ether and allowed to dry by pumping in vacuum at 25° C. for 2 days. The light green powder product was found by elemental analyses to correspond to the formula, $Li_3[Co(CN)_5] \cdot 3.5DMF$ (Compound 2)

Calcd (%) for $C_{15.5}H_{24.5}N_{8.5}O_{3.5}CoLi_3$: Co, 12.65; Li, 4.47; Found (%): Co 12.8, 12.9; Li 4.61, 4.63.

EXAMPLE 2

Reactivity of $Li_3[Co(CN)_5] \cdot 3.5DMF$(compound 2) with Oxygen

A sample of compound 2 (54.50 mg) was transferred under $N_2$ to the weighing pan of a DuPont 2950 thermogravimetric analyzer. With the introduction of $O_2$ a very slow uptake of 0.877 wt % (0.27 mmoles $O_2$ per gram) was observed over a period of ten minutes. On flushing with $N_2$ for 25 minutes a slow $O_2$ desorption of 0.486 wt % (0.15 mmoles $O_2$/gram) was observed.

EXAMPLE 3

Thermolysis of 1A and Preparation of $Li_3[Co(CN)_5] \cdot \sim 2DMF$(cmpd. 3)

Compound 1A (i.e. compound 1 with one extra mole of DMF, analyzing as $Li_3[Co(CN)_5] \cdot 5DMF$) was loaded on the pan of a Perkin Elmer TGA with a minimal exposure to air. It was heated under a purge of $N_2$ (100 cc/min) at a rate of 5° C./min to 160° C., and then kept at this temperature for twenty minutes. At $\sim 100°$ C. a weight loss of 12.4% was observed corresponding to the loss of the "fifth" loosely adsorbed DMF. Between 130° C. and 160° C. a further 24.81% loss was seen which corresponds to the removal of approximately 2 (more tightly held) DMF molecules. This results in a material of composition $Li_3[Co(CN)_5] \cdot \sim 2DMF(3)$. Samples of 1 that have been dried more thoroughly are closer to the composition $Li_3[Co(CN)_5]\cdot 4DMF$ or $Li_3[Co(CN)_5]\cdot 3.5DMF(2)$ and on heating to 160° C. give a 31% weight loss between 130° C. and 160° C. corresponding to the removal of $\sim 2DMF$ molecules to yield a material (compound 3A) of the same composition as compound 3 above. In this case the initial weight loss at $\sim 100°$ C. due to a "fifth" weakly adsorbed DMF molecule was not seen. In either case, the final composition of the material obtained at 160° C. was $Li_3[Co(CN)_5]\cdot \sim 2DMF$(compounds 3 and 3A). This composition was confirmed by elemental analyses.

Calcd (%) for $Li_3[Co(CN)_5]\cdot 1.8DMF$: C, 36.56; H, 3.69; N, 27.89; Li, 6.40; Co, 17.26;

Found (%): C, 36.19; H, 3.36; N, 27.43; Li, 6.19.

The infrared spectrum of compounds 3 and 3A in the cyanide region shows a splitting of the single strong IR absorption of compound 1 into three, also intense bands at 2087.5, 2102.3 and 2117.1 cm$^{-1}$, thus differentiating it from compound 1. Compounds 3 and 3A were identical in their composition, structure and $O_2$ reactivity but had different bulk densities measured by Hg intrusion at 1 atm of 0.472 g/cc and 0.619 g/cc respectively.

EXAMPLE 4

Reversible Oxygen Binding Properties of $Li_3[Co(CN)_5]\cdot \sim 2DMF(3)$

Figure 1:
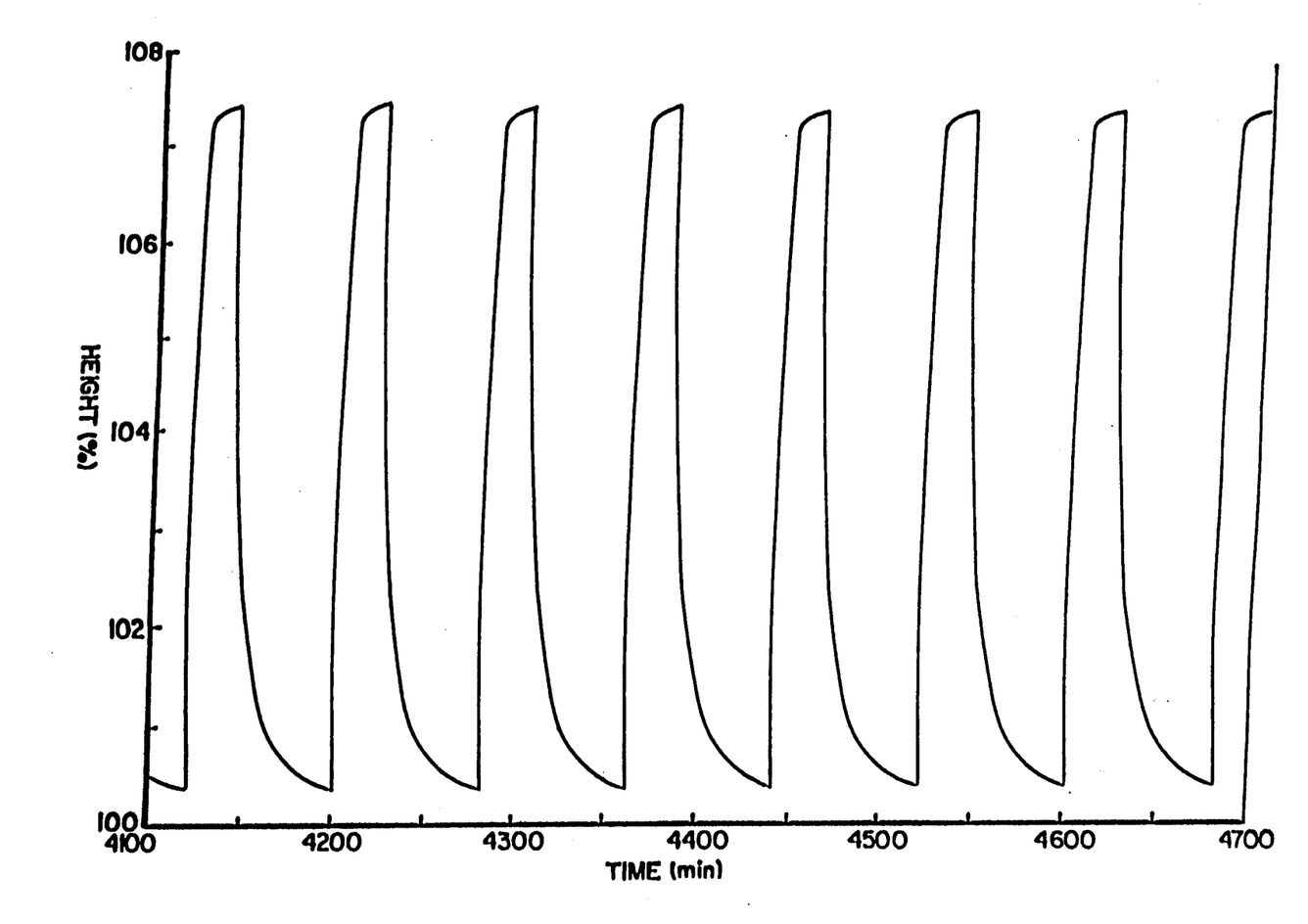

Compound 3 was prepared as described in Example 3. On contacting a sample of compound 3 contained in a TGA balance pan at 30° C. with oxygen the sample changed color from a pale green to red as it absorbed up to ca 5.0% by weight (1.5 mmoles/g) of oxygen within five minutes. When the oxygen over the sample was replaced with a flow of $N_2$ the sample desorbed 1.2 mmoles/g of $O_2$ within 15 minutes. Experiments were also conducted on a sample of compound 3 loaded on a TGA instrument that was enclosed in an $N_2$-containing glove bag to protect the sample from air and moisture. The reversible uptake of $O_2$ was dramatically increased to $\sim 2.3$ mmoles/g, and the stability of the sample during cycling was also found to increase. An illustration of $O_2/N_2$ cycling is shown in the graph of the accompanying Figure wherein the complex increases in weight upon contact with $O_2$ and correspondingly decreases in weight when the $O_2$ is replaced by $N_2$. Oxygen/nitrogen cycling experiments in a TGA instrument with very dry gas streams show only a slight loss of activity over 40 cycles under $O_2$ (10 min) the $N_2$ (25 min).

Although this Example demonstrates that this selective $O_2$-sorbent, compound 3, is preferably used with very dry air, other complexes used in this invention are suitable for use under conditions where the air contains moisture.

The following is $O_2/N_2$ cycling data (5 min $O_2$/10 min $N_2$ cycle) for a sample of compound 3 that had been loaded (as the precursor 1A) on to the pan of a Perkin Elmer T6A with minimal, not complete, exposure to ambient air.

| Cycle No. | 0 | 106 | 366 | 566 | 774 | 986 |
|---|---|---|---|---|---|---|
| $O_2$ Uptake (mmole/g) | 1.25 | 1.11 | 0.99 | 0.93 | 0.88 | 0.86 |

After the 986 cycles the sample was flushed with $N_2$ overnight and was then found to have an $O_2$ uptake of 1.06 mmole $O_2$/g. This data shows that the $O_2$-sorbent complex has an exceptional stability and a high $O_2$ capacity even after almost 1000 oxygenation/deoxygenation cycles.

Raman and infrared vibrational spectroscopy was used to elucidate the mode of $O_2$ binding to $Li_3[Co(CN)_5]\cdot \sim 2DMF$(cmpd 3). A sample of this compound when exposed to $^{16}O_2$ showed a band in the Raman at 1131 cm$^{-1}$ which shifted to 1068 cm$^{-1}$ upon exposure to $^{18}O_2$. Similar results were seen in the infrared. The 1131 cm$^{-1}$ vibrational frequency is thus assigned to a $\nu_{O-O}$ stretching mode for a $Li_3[Co(CN)_5\cdot O_2]\cdot \sim 2DMF$ complex wherein the oxygen is in a terminally bound "superoxo" form. The $\nu_{CN}$ bands of compound 3 are blue shifted (moved to higher energies) by $\sim 40$ cm$^{-1}$ upon oxygenation of the complex.

EXAMPLE 5

Synthesis and Oxygen Reactivity of $Li_3[Co(CN)_5]\cdot pDMF$ where $p\sim 3.2$ and $\sim 1.3$ A sample of $Li_3[Co(CN)_5]\cdot \sim 5DMF(1A)$ was heated at 5° C./min to 155° C. and cooled immediately, all under a flow of $N_2$. An overall weight loss of 24% was observed corresponding to a resultant composition of $Li_3[Co(CN)_5]\cdot \sim 3.2DMF$. On introducing $O_2$ an uptake of 3.08% by weight in 5 minutes (0.93 mmole $O_2$/g) was observed which could be reversed by flushing with $N_2$. This uptake is lower than that for $Li_3[Co(CN)_5]\cdot \sim 2DMF$ in the same time period (1.5 mmoles $O_2$/g) but nevertheless, still substantial.

In another experiment a sample of $Li_3[Co(CN)_5]\cdot \sim 5DMF(1A)$ was heated at 10° C./min to 200° C. under $N_2$ and then cooled. A weight loss of 46.9% was observed leaving the material with a composition $Li[Co(CN)_5]\cdot \sim 1.3DMF$. Introduction of $O_2$ gave an uptake of $\sim 4\%$ by weight (1.26 mmole $O_2$/g) over 1 hour. It desorbed $\sim 1.64\%$ over 1 hour under $N_2$.

EXAMPLE 5A (COMPARATIVE)

Synthesis and Oxygen Reactivity of $Li_3[Co(CN)_5]\cdot pDMF$ where $p=0$

The procedure of Example 5 above was carried out with further heating the sample 1A under $N_2$ ultimately to 250° C. There was a weight decrease of 61.55% corresponding to a loss of all the DMF ligands. This resulting material was tested and did not show a weight gain when exposed to oxygen. This clearly demonstrates the importance of the presence of the ligands on the complexes used in the present process.

EXAMPLE 6

Synthesis and Temperature-Reversible Oxygen Absorbing Properties of $Li_3[Co(CN)_5]\cdot 4NMP$ (NMP=N-methyl-2-pyrrolidinone)

Anhydrous cobalt chloride (0.28 g, 2.16 mmoles) was dissolved in 30 ml of dry NMP. In a separate vessel, the solid LiCN·xTHF adduct used as obtained from Alfa (2 g, 14.17 mmole, the LiCN mmoles calculated on the basis of x=1.5, the specification given by the manufacturer) was stirred in 40 ml of NMP with warming. Undissolved solids (considered to be impurities) were removed by filtration. The cobalt chloride solution in NMP was added to the filtrate giving a green solution. To this was added diethylether ($\sim 10$ ml) and the solution was set aside from 2 hours. The yellow green crystals that formed were filtered, washed with ether and dried in vacuum for 8 hours. Yield (1.02 g, 1.68 mmole of $Li_3[Co(CN)_5]\cdot 4NMP$)

Elemental analysis: Calcd (%) for Li$_3$[Co(CN)$_5$]·4NMP(3) C, 49.48; H, 5.93; N, 20.78;

Found (%): C, 48.90; H, 5.84; N, 19.77. Infrared: Nujol mull, cyanide band 2102 cm$^{-1}$(s)

The Li$_3$[Co(CN)$_5$]·4NMP (52.18 mg) was loaded on a pan of a TGA without exposure to air. On heating the sample to 165° C. and holding for ten minutes a weight loss of 24.26% was observed. Introduction of O$_2$ at 30° C. for 25 minutes gave a weight uptake of 0.946% (0.295 mmoles O$_2$/g). The oxygen absorbed was removed by heating to 120° C. under N$_2$ for 45 minutes. In this process some loss of solvent (NMP) was observed. The "temperature swing" cycling procedure: absorption of O$_2$ at 30° C., desorption of O$_2$ under N$_2$, was repeated eight times; the data is summarized below.

| Cycle No. | 1 | 2 | 3 | 4 | 5 | 6 | 7 | 8 |
|---|---|---|---|---|---|---|---|---|
| O$_2$ uptake (mmoles/g) | 0.295 | 0.223 | 0.203 | — | — | 0.174 | — | 0.143 |

EXAMPLE 7

Synthesis of Li$_3$[Co(CN)$_5$]·~3.5DMAC (DMAC=N,N-dimethylacetamide)

Anhydrous cobalt chloride (0.25 g, 1.92 mmole) was dissolved in ~15 ml of DMAC (Aldrich). In another vessel, solid LiCN·1.5THF(1.38 g, 9.79 mmoles) (see comments about this reagent in Example 6)) was dissolved in 70 ml of DMAC with warming. Undissolved solids (considered to be impurities) were removed by filtration. The cobalt chloride solution was added to the LiCN-containing filtrate with vigorous stirring giving a green solution. After one hour a green precipitate appeared. This was filtered, washed with 2×40 ml of dry diethylether and dried in vacuum resulting in a yellow green powdered product (1.05 g, 1.97 mmole of 4)

Elemental analyses: Calcd (%) for Li$_3$[Co(CN)$_5$]·3.5DMAC: C, 44.3; H, 6.12; N, 23.12; Co, 11.45; Li, 4.04; Found (%): C, 43.27; H, 6.21; N, 20.90; Co, 11.02; Li, 3.04. Infrared: Nujol mull, cyanide band at 2099 cm$^{-1}$.

EXAMPLE 8

Reactivity of Li$_3$[Co(CN)$_5$]·3.5DMAC and of its Thermolysis Product with Oxygen A sample of Li$_3$[Co(CN)$_5$]·3.5DMAC synthesized in Example 7 above was loaded on to a DuPont 2950 TGA analyzer without exposure to air. Upon introduction of O$_2$ at 30° C. a weight increase of 2.64% (0.82 mmoles O$_2$/g) was observed over ½ hour. The O$_2$ could be desorbed by flushing with N$_2$ for ~8 hours. Reintroduction of O$_2$ at 30° C. led to an identical absorption of the gas over a similar time period.

A sample of Li$_3$[Co(CN)$_5$]·~3.5DMAC from Example 7 was loaded on a Perkin Elmer TGA with a minimal exposure to air. On heating at 2° C./min to 110° C. and cooling a weight loss of 13.36% was observed [~0.8DMAC]. Introduction of O$_2$ at 30° C. turned the yellow green sample to orange and a weight gain of 1.44%(0.45 mmole/g) was observed over 15 minutes. Heating to 90° C. turned the orange sample back to yellow-green and a weight loss of 2.8% was seen. Thus in addition to the O$_2$ desorption, heating also results in the removal of some solvent. Reintroduction of O$_2$ in a second cycle showed a weight gain of 1.2% (0.37 mmol/g) over a period of 20 minutes. The same experiment performed on a DuPont TGA without any exposure of the sample to air resulted in approximately twice the uptake over a similar time period, attesting to the high sensitivity of the sample to atmospheric moisture. The O$_2$ adduct of this complex also shows the growth of a new absorption band at 1130 cm$^{-1}$ in the infrared, which is assigned to the vibrational frequency of the bound O$_2$ molecule in Li$_3$[Co(CN)$_5$13 O$_2$]·xDMAC.

EXAMPLE 9

Synthesis and Reversibly O$_2$ Absorbing Properties of Li$_3$[Co(CN)$_5$]·1.42DMF·0.48DMAC Anhydrous cobalt chloride (0.24 g, 1.92 mmole) dissolved in ~25 ml of N,N-dimethylacetamide was added to ~21 ml of 0.5M LiCN (Aldrich) in DMF. The yellow solution was allowed to stand overnight giving a green very finely crystalline product. This was filtered, washed with 2×20 ml of ether and dried overnight in vacuum at room temperature. A small sample was loaded on a TGA analyzer and heated at 5° C./min to 160° C. under 100 cc/min N$_2$ and kept at 160° C. for 20 minutes. An overall weight loss of 31.2% was seen. Elemental analyses on a larger (ca 1 g) sample prepared and pyrolyzed in the same way were consistent with the formula: Li$_3$[Co(CN)$_5$]·1.42DMF·0.48DMAC.

Calcd (%): C, 37.76; H, 6.01; N, 27.19; Li, 5.85; Co, 16.58; Found (%): C, 37.59; H, 6.02; N, 27.09; Li, 5.81; Co, 16.51.

A sample of Li$_3$[Co(CN)$_5$]·1.42DMF·0.48DMAC prepared in situ in a TGA analyzer as described above was studied gravimetrically for reactivity with O$_2$. Upon introduction of O$_2$ at 25° C. a weight gain corresponding to an absorption of 1.5 mmole O$_2$/g was observed in 5 minutes. This O$_2$ was desorbed by flushing with N$_2$ for 20 minutes.

Volumetric O$_2$ absorption measurements on a sample showed an overall uptake of ~40 cc O$_2$/g (1.78 mmoles O$_2$/g) at one atm of O$_2$ in comparison to ~55 cc O$_2$/g (2.45 mmoles O$_2$/g) for Li$_3$[Co(CN)$_5$]·2DMF.

EXAMPLE 10

Preparation of Mg$_{1.5}$[Co(CN)$_5$]·~3DMF

Tris (tetraethylammonium) pentacyanocobaltate, (Et$_4$N)$_3$Co(CN)$_5$ was prepared according to the method of Baizer et al, *Inorg. Chem.*, 11, 2160 (1972) by the reaction of anhydrous cobalt chloride (0.1M in DMF) with five equivalents of Et$_4$N$^+$CN$^-$ (Fluka) (also 0.1M in DMF). The product was precipitated by the addition of ether. Its cyanide stretching frequency of 2065 cm$^{-1}$(s) contrasts with the 2080 cm$^{-1}$ reported by Baizer et al for this material. S. J. Carter et al. *Inorg. Chem.* 25 2588 (1986) reported a similar $v_{CN}$ to ours, and we believe it to be correct.

The prepared (Et$_4$N)$_3$Co(CN)$_5$(0.997 g, 1.7 mmole) was stirred in ~40 ml of DMF for five minutes. In a separate vessel, magnesium triflate, Mg(CF$_3$SO$_3$)$_2$ (0.829 g, 2.57 mmoles) (Aldrich) was dissolved in ~40 ml DMF with warming. This solution (after cooling to room temperature) was added immediately to the (Et$_4$N)$_3$Co(CN)$_5$ in DMF, the mixture was swirled once and then filtered through a medium porosity frit. A large excess of ether (~250 ml) was poured into the yellow green filtrate thus precipitating a green solid. This was filtered, washed with 50 ml of ether, with 50 ml of acetonitrile and then by 50 ml of ether again to yield a yellow-green powder. The powder was dried in vacuum overnight. Yield (0.63 g, 95%). Infrared spectrum: Nujol mull, cyanide band 2122 cm$^{-1}$(s), 2156(sh).

Elemental analysis of Prep. #1: Calcd (%) for Mg$_{1.5}$[Co(CN)$_5$]·2.17DMF Calcd (%): Mg 9.49; Co, 15.34; C, 35.96; H, 3.95; N, 26.14; Found (%): Mg 10.04; co, 15.35; C, 35.99; H, 4.20; N, 25.17.

Elemental analysis of Prep. #2: Calcd for Mg$_{1.5}$[Co(CN)$_5$]·2.87DMF·0.1Mg(CF$_3$SO$_3$)$_2$: Calcd: Mg, 8.31; Co, 12.60; C, 35.45; H, 4.29; N, 23.57; Found: Mg, 8.54; Co, 12.64; C, 35.55; H, 4.32; N, 23.71.

Elemental analysis of Prep. #3: . . . Calcd for Mg$_{1.5}$[Co(CN))$_5$]·3DMF·0.2Mg(CF$_3$SO$_3$)$_2$ C, 33.93; H, 4.12; N, 21.99; Mg, 8.11; Co, 11.57; Found: C, 34.66; H, 3.97; N, 22.26; Mg, 8.34; Co, 11.7.

EXAMPLE 11

Reactivity of Mg$_{1.5}$[Co(CN)$_5$]·~3DMF with Oxygen

A sample of Mg$_{1.5}$[Co(CN)$_5$]·~3DMF prepared in Example 10 was transferred without exposure to air to a TGA instrument. Upon admission of O$_2$ there was a rapid weight increase from sorption of the gas, which could be reversed by replacing the atmosphere with N$_2$. Oxygen/nitrogen cycling data for 5 minutes under O$_2$ then 40 minutes under N$_2$ is given below.

| Cycle No. Uptake | 1 | 9 | 15 | 28 | 45 | 50 |
| --- | --- | --- | --- | --- | --- | --- |
| (mmole O$_2$/g) | 0.78 | 0.46 | 0.43 | 0.39 | 0.37 | 0.36 |

Exposure of the sample to pure oxygen was accompanied by a change in color from green to red. Solid state UV/vis light reflectance measurements showed a band at 611 nm for the unoxygenated complex. Upon admission of O$_2$ a new band appeared at ~524 nm. The infrared spectrum of a sample in a Nujol mull showed a cyanide band at 2121 cm$^{-1}$(s) with a shoulder at 2156 cm$^{-1}$. Exposure to ambient air resulted in the growth of a new band at 2161 cm$^{-1}$ for the cyanide (expected blue shift) and a new peak at 1128 cm$^{-1}$ corresponding to the $\nu_{O-O}$ stretching frequency. This result was also confirmed by Raman spectroscopy where the band at 1127 cm$^{-1}$ appeared on exposure of the sample to pure oxygen.

EXAMPLE 12

Preparation and Reversible Oxygen Absorbing Properties of a Mixture of 62% Li$_2$Co(CN)$_4$·pS and 38% Li$_3$Co(CN)$_5$·pS in which S=75% Methylpyrrolidinone and 25% DMF A 0.5M solution of lithium cyanide in DMF (37.2 mL, 18.6 mmol) was added to a solution of CoCl$_2$ (0.605 g, 4.66 mmol) in N-methyl-2-pyrrolidinone (NMP, 55 mL) at room temperature. The dark green reaction mixture was stirred vigorously for two hours before diethyl ether (40 mL) was added to precipitate the product as a green-blue flocculent solid. The floccules were stirred in the mother liquor for approximately 16 hours after which time the mixture was filtered. The green-blue powder was washed with diethyl ether (2×20 mL), NMP (20 mL), and more diethyl ether (3×20 mL) before it was dried under vacuum (room temperature, 10$^{-3}$ mmHg, 22 hr) to yield 1.436 g of the green-blue material.

FTIR (Nujol): 2144(m), 2114(sh), 2103(s) cm$^{-1}$ $\nu_{(CN)}$.

Upon exposure to oxygen in Nujol, the infrared absorption of this material at 2103 cm$^{-1}$ became less intense while the 2144 cm$^{-1}$ band became more intense. A new peak at 1125 cm$^{-1}$ which may be assigned as $\nu_{O-O}$ was also observed. Evacuation of the infrared cell led to a partial reversal of the changes caused by oxygenation.

Elemental Analysis (Found): Li, 3.78; Co, 13.5; Li/Co ratio=2.38

The relative amounts of NMP (75%) and DMF (25%) in this material were determined by solids probe electron ionization (70 eV) mass spectrometry using compound-specific ions.

A sample of this material gained 2.3% (0.72 mmol/g) by weight upon exposure to oxygen over a period of 10 minutes at 30° C. On switching to nitrogen, a weight loss of 0.78% was observed in 30 minutes at 30° C. Oxygen/nitrogen cycling data for 10 minutes under oxygen and 30 minutes under nitrogen is given below.

| Cycle No. | 1 | 2 | 3 | 16 |
| --- | --- | --- | --- | --- |
| Uptake (mmol O$_2$/g) | 0.72 | 0.13 | 0.10 | 0.05 |

EXAMPLE 13

Preparation of Li$_2$Co(CN)$_4$·2.3DMF

A 0.5M solution of lithium cyanide in DMF (34.5 mL, 17.2 mmole) was added to a solution of CoCl$_2$ (0.560 g, 4.31 mmole) in DMF (53 mL) at room temperature. The green reaction mixture was stirred vigorously for 1.5 hr before diethyl ether (45 mL) was added to precipitate the product as a blue-green gel. The gel was vigorously stirred in the mother liquor for four hours after which time the brown supernatant was decanted. Fresh diethyl ether (30 mL) was added to the blue-green gel, and a blue-green powder was obtained by vigorously stirring for 48 hr. The blue-green powder was filtered, washed with diethyl ether (3×20 mL), and dried under vacuum (room temperature, 10$^{-3}$ mmHg, 20 hr) to produce 0.440 g (1.28 mmole, 30%) of this material. FTIR (Nujol): 2104 cm$^{-1}$ $\nu_{(CN)}$.

Elemental Analysis for Li$_2$Co(CN)$_4$·2.3DMF:

Expected: C, 37.95; H, 4.70; N, 25.57; Li, 4.02; Co, 17.08; Found: C, 37.43; H, 5.08; N, 24.09; Li, 3.89; Co, 16.7. Li/Co Ratio=1.98.

Oxygen Sorption/Desorption Behavior of Li$_2$Co(CN)$_4$·2.3DMF

The material synthesized above was observed to gain weight (>1.6%) upon exposure to dry oxygen on a TGA; however, weight loss (either at 30° C. or 40° C.) could not be used as a criterion to determine oxygen desorption because this sample continually lost weight due to solvent (DMF) loss. As more and more solvent was lost from the sample (especially via heating the sample) oxygen uptake decreased dramatically.

A more satisfactory means of determining that this sample has some capacity to reversibly bind oxygen was by FTIR spectroscopy using a gas cell in which one of the NaCl windows could be coated with a nujol mull of the sample. The mull was prepared and the cell assembled under argon. An FTIR spectrum of the oxygen-free material was obtained, and then the cell was purged with dry oxygen (through two septa on the cell) for approximately two minutes. An FTIR spectrum of the oxygenated material was obtained; it showed a shoulder on the cyanide band (2142 cm$^{-1}$). The difference spectrum (oxygen-argon) clearly showed that a new band at 1128 cm$^{-1}$ (1065 cm$^{-1}$ when $^{18}O_2$ was used) had grown in in addition to the new cyanide band at 2149 cm$^{-1}$ and a decrease in the 2102 cm$^{-1}$ cyanide band. The cell was evacuated (200 millitorr) for 5 minutes and purged with nitrogen for 30 minutes. The difference spectrum (nitrogen-oxygen) afterward showed a decrease in the oxygen band (1127 cm$^{-1}$) as well as decreases in the DMF peaks and changes in the cyanide region (as if new species might be forming). The cell was purged with nitrogen for 20 hr before it was purged with oxygen again. The difference FTIR (2nd oxygen-20 hr nitrogen) showed again an increase in the 1127 cm$^{-1}$ band as well as an increase in the 2150 cm$^{-1}$ band and a decrease in the 2106 cm$^{-1}$ band in the cyanide region. These observations are consistent with the material chemically binding oxygen to form a Co(III) "superoxo" complex and undergoing at least a partial desorption of $O_2$ upon purging with nitrogen at room temperature.

EXAMPLE 14

Preparation of $Li_2Co(CN)_4 \cdot 2.9DMF$

A 0.5M solution of lithium cyanide in DMF (37.0 mL, 18.5 mmole) was added to a solution of $CoCl_2$ (0.600 g, 4.62 mmole) in DMF (55 mL) at room temperature. The green reaction mixture was stirred vigorously for 127 minutes before diethyl ether (40 mL) was added to precipitate the product as a blue-green gel. The gel was vigorously stirred in the mother liquor for approximately 19 hours after which time the mixture was filtered. The purple-grey powder which was left in the frit was washed with diethyl ether (2×20 mL), a 4:3 (v/v) DMF/diethyl ether solution (2×14 mL), and more diethyl ether (3×20 mL) before it was dried under vacuum (room temperature, 10$^{-3}$ mmHg, 21.5 hr) to yield 0.738 g (1.90 mmole, 41%) of the purple-grey material. FTIR(Nujol): 2144 (s), 2116 (s), 2106 (sh) cm$^{-1}$ $\nu_{(CN)}$.

Elemental Analysis for $Li_2Co(CN)_4 \cdot 2.9DMF$: Expected: C, 39.23; H, 5.26; N, 24.85; Li, 3.57; Co, 15.16; Found: C, 37.61; H, 5.11; N, 23.48; Li, 3.61; Co, 15.0.

Li/Co Ratio=2.04.

The same procedure was repeated using the same amounts of reagents and identical reation and work-up times. A purple-grey material which had cyanide stretches at 2144(s), 2113(s), and 2105(sh)cm$^{-1}$ was obtained in 28% yield.

Oxygen Sorption/Desorption Behavior of $Li_2Co(CN)_4 \cdot 2.9DMF$

The above material was observed to gain weight (1.6%) upon exposure to dry oxygen on a TGA; however, weight loss (at 30° C. or with heating) could not be used as a criterion to determine oxygen desorption because this sample continually lost weight due to solvent (DMF) loss. As more and more solvent was lost from the sample (especially via heating the sample) oxygen uptake decreased dramatically.

The reversible $O_2$-binding property of this complex was demonstrated using FTIR spectroscopy by the method described in Example 13. An FTIR spectrum of the oxygen-free material was obtained, and then the cell was purged with dry oxygen (through two septa on the cell) for approximately two minutes. An FTIR spectrum of the oxygenated material was obtained; it showed a decrease in the 2119 cm$^{-1}$ peak in the cyanide region relative to the 2144 cm$^{-1}$ band. The difference spectrum (oxygen-argon) clearly showed that a new band at 1127 cm$^{-1}$ had grown in in addition to the new cyanide bands at 2139 and 2157 cm$^{-1}$ and decrease in the 2104 cm$^{-1}$ cyanide band. The cell was evacuated for 5 minutes (500 millitorr) and then purged with nitrogen for one hour. The difference FTIR spectrum (nitrogen-oxygen) afterward showed a decrease in the oxygen band (1127 cm$^{-1}$) as well as decreases in the DMF peaks and changes in the cyanide region (a decrease in the 2139 cm$^{-1}$ band and an increase in the 2103 cm$^{-1}$ band were seen in addition to changes which suggested that new species might be forming). The cell was purged with nitrogen for 2.5 hr before it was purged with oxygen again. The difference FTIR (2nd oxygen-2.5 hr nitrogen) showed again an increase in the 1127 cm$^{-1}$ band as well as an increase in the 2140 and 2154 cm$^{-1}$ bands and a decrease in the 2106 cm$^{-1}$ band in the cyanide region. These observations are consistent with the material chemically binding oxygen and undergoing a partial desorption upon purging with nitrogen at room temperature.

EXAMPLE 15

Synthesis and Reversibly $O_2$ Absorbing Properties of $Li[Co(CN)_3] \cdot 2DMF$ A solution of 0.277 g of $CoCl_2$ (2.1 mmol) in 20 mL of dry N,N-dimethylformamide (DMF) was prepared in an iert atmosphere. To this solution was added with stirring 12.8 mL of a 0.5 molar solution of lithium cyanide (6.4 mmol, 3.0 equivalents) in DMF. The reaction mixture was stirred for 1 hour, then treated with 15 mL of diethylether, causing the appearance of a dark green precipitate and a pale green supernatant. After stirring overnight under an inert atmosphere, a dark blue solid had formed. The blue powdery solid was isolated by suction filtration through a fritted glass disc. The product was washed with three portions of DMF, in which it is sparingly soluble, and then with diethylether to facilitate drying. The product, which weighted 0.599 g (59% yield), was dried in vacuo.

The infrared spectrum of this product measured in a mineral oil mull shows a strong cyanide absorption band at 2115 cm$^{-1}$ and an intense absorption at 1658 cm$^{-1}$ assigned to the carbonyl moiety of DMF. Upon exposure to oxygen in the mineral oil dispersion, the infrared absorption of this compound at 2115 cm$^{-1}$ became progressively less intense while a new cyanide stretching mode appeared at 2152 cm$^{-1}$. A new absorption band also appeared at 1125 cm$^{-1}$, which may be assigned as $\nu_{O-O}$. Evacuation of the infrared cell led to a partial reversal of the changes caused by oxygenation.

Reflectance visible spectroscopy of this sample sealed in a glass cell under an argon atmosphere indicated a strong absorption band centered around 604 nm. When pure oxygen was admitted into the cell, the color changed color from blue to purple-black within one minute. The reflectance spectrum of this oxygenated sample showed a new absorption feature centered near 495 nm which diminished upon subsequent evacuation of the cell.

Elemental analysis: Calc'd for $LiCo(CN)_3 \cdot 2DMF$ ($C_9H_{14}CoLiN_5O_2$) (%): C, 37.26; H, 4.86; N, 24.14; Li, 2.39; Co, 20.31. Found (%): C, 35.63; H, 4.62; N, 23.81; Li, 2.26; Co, 19.57. (Li:Co=1:1.02) Found (%): C, 36.08; H, 4.80; N, 23.38; Li, 2.32. (Li:C=1:8.99)

Heating to 400° C. in a thermogravimetric analyzer resulted in a weight loss of 48.6%, corresponding to the loss of 2.0 DMF molecules per cobalt atom.

A sample of this material gained 2.84% (0.888 mmol O₂/g) by weight upon exposure to O₂ over a period of 10 minutes at 30° C. On switching to N₂, a weight loss of approximately 1.53% was observed in 30 minutes while maintaining the temperature at 30° C. Subsequent isothermal cycling of O₂ and N₂ at 30° C. gave uptakes of 0.93%, 0.63%, 0.48%, 0.41%, and 0.37%, sequentially. These oxygen capacities correspond to 0.291, 0.197, 0.150, 0.128, and 0.116 mmol of O₂ per gram of absorbent.

EXAMPLE 16

Attempted preparation of Na₃Co(CN)₅·DMF

A solution of finely ground sodium cyanide (0.378 g, 7.7 mmol) was prepared in 100 mL DMF. To this was added a solution of cobalt chloride (0.1875 g, 1.44 mmol) in 20 mL DMF. Initially the solution turned to a wine red, burgundy color. On stirring over the weekend a yellow green solution was formed. A small aliquot of this solution did not change color when exposed to air. Addition of ether gave a green colored solid which did not change color on exposure to O₂. Based upon these observations we believe that the usually very air-sensitive Co(CN)₅³⁻ ion which is necessary for arriving at the required Na₃Co(CN)₅·xDMF solid was not present in the above yellow-green solution. Hence it appears unlikely that the prepared green solid is the required compound although closer controlled or alternative synthetic methods should be successful in synthesizing the subject complex.

EXAMPLE 17

Attempted preparation of Li₃Co(CN)₅·xTHF

Anhydrous cobalt chloride (0.25 g) was dissolved in 125 mL of dry THF. This was added to a solution of 2 g LiCN·1.5THF (Alfa) in 135 mL of THF. A green precipitate was formed. This was isolated by filtration and was found to turn to a brown color upon drying in 'vacuo'. This resulting brown solid did not change color upon exposure to O₂. However, the green solid obtained before drying did change color on exposure to air. Based on these results, we believe that the THF solvate was lost during the drying process thus converting the O₂ reactive solid (green) to an O₂ unreactive material (brown).

Having thus described the present invention, what is now deemed appropriate for Letters Patent is set out in the following appended claims:

1. A process for removing oxygen from a fluid stream containing free oxygen and at least one other component which is inert to the complex described below, said process comprising bringing said fluid stream into contact with an aluminosilicate-free solid state composition comprising one or more cyanocobaltate complexes represented by the chemical formula:

$A_{x/z}^{z+}[Co(CN)_n]^{x-} \cdot pS$ where:
A is an alkali metal atom, alkaline earth metal atom, Zn, Cd, or Hg atom;
z is 1, 2 or 3;
n is 3, 4 or 5;
x is n−2;
p is any number from greater than zero to 6; and
S is a ligand selected from the group consisting of N,N-dialkyl amides, alkyl lactams, N-alkyl imides, ammonia, chelating tertiary amines, N-heterocycles, bipyridyls and substituted dipyridyls, organic nitriles, dicyanamide anion, dicyanomethane anion, halide ions, SCN⁻, NCS⁻ and mixtures thereof which is capable of coordinating with $A^{z+}$, Co or both;

wherein said cyanocobaltate complex repeatedly, selectively and reversibly chemically binds oxygen, thereby removing oxygen from the fluid stream.

2. The process of claim 1 wherein oxygen is selectively removed from a gas stream containing oxygen and nitrogen.

3. The process of claim 1 wherein oxygen is selectively removed from a gas stream containing argon and oxygen.

4. The process of claim 1 wherein A is Li or Mg.

5. The process of claim 1 wherein S is selected from the group consisting of N,N-dimethylformamide, N-methyl-2-pyrrolidinone, N,N-dimethylacetamide and mixtures thereof.

6. The process of claim 5 wherein p is a number from 2 to 3.

7. The process of claim 1 wherein n is 5.

8. The process of claim 1 wherein after the cyanocobaltic complex selectively binds oxygen, it is subjected to increased temperature or reduced partial pressure of oxygen to cause the bound oxygen to be released from the complex.

9. The process of claim 1 which is a pressure swing adsorption process.

10. The process of claim 9 wherein the oxygen-containing fluid stream is brought into contact with the cyanometallate complex at a pressure from 1 to 10 atmospheres.

11. The process of claim 1 which is a temperature swing adsorption process.

12. The process of claim 1 wherein the cyanocobaltate complexes are in the form of powders, pellets, or crystals.

13. The process of claim 12 wherein the cyanocobaltate complexes are present in an inert liquid to form a slurry.

14. The process of claim 12 wherein the cyanocobaltate complexes are positioned on an inert carrier which is not an aluminosilicate or a zeolitic material.

15. The process of claim 1 wherein the oxygen-containing fluid stream is a dry gaseous stream.

16. The process of claim 15 wherein said dry gaseous stream is air.

17. The process of claim 1 wherein said cyanocobaltate complexes bind from 0.27 to 2.3 millimoles of O₂ per gram of complex.

18. The process of claim 1 wherein A is Zn or Cd.

19. The process of claim 1 wherein S is an N-heterocycle selected from the group consisting of pyridine, alkyl or perfluoroalkyl ring-substituted pyridines, N-methylimidazole and 1,2; 1,3 and 1,4-diazines.

20. The process of claim 1 wherein S is an organic nitrile selected from the group consisting of dicyanogen, acetonitrile, benzonitrile, t-butylnitrile and dicyanoalkanes.

21. The process of claim 1 wherein S is a N,N-dialkyl formamide.

22. The process of claim 21 wherein S is dimethyl formamide.

23. The process of claim 1 wherein S is an alkyl lactam selected from the group consisting of N,N-dimethylacetamide, N-methyl-2-pyrrolidinone and N-methyl piperidone.

* * * * *